May 15, 1923.
E. S. LUDLOW
1,455,538
FENDER PROTECTOR
Filed Aug. 28, 1922
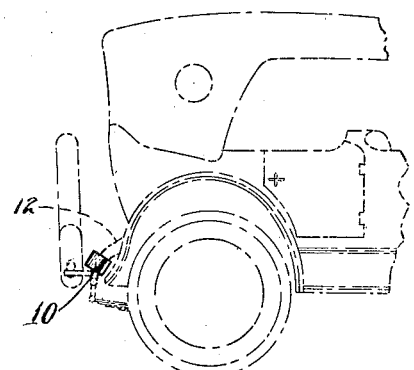
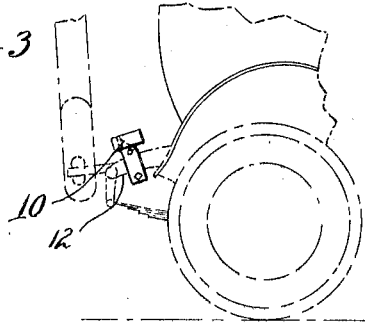
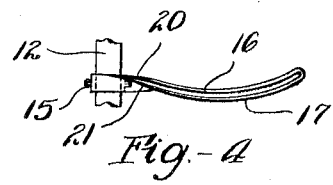
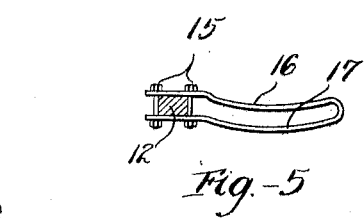
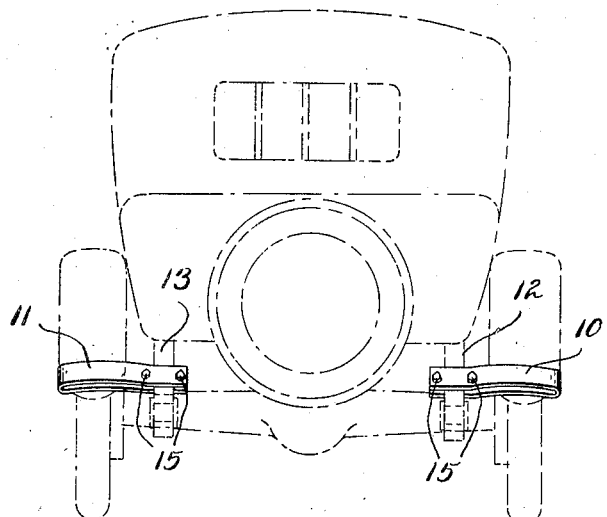
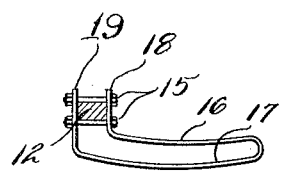
INVENTOR
Edgar S. Ludlow,
By Baker & Macklin
ATTYS Patented May 15, 1923.

1,455,538

UNITED STATES PATENT OFFICE.

EDGAR S. LUDLOW, OF CLEVELAND HEIGHTS, OHIO.

FENDER PROTECTOR.

Application filed August 28, 1922. Serial No. 584,803.

*To all whom it may concern:*

Be it known that I, EDGAR S. LUDLOW, a citizen of the United States, residing at Cleveland Heights, in the county of Cuyahoga and State of Ohio, have invented a certain new and useful Improvement in Fender Protectors, of which the following is a full, clear, and exact description, reference being had to the accompanying drawings.

This invention relates to bumpers for automobiles and has particular reference to the provision of means for protecting the rear fenders from side swiping or direct impact with the fenders of another automobile.

Additional objects include the provision of strong protectors for each fender, which are adapted to be mounted on the chassis frame in such manner as to afford sufficient protection to the fenders, and at the same time to permit ready removal of the spare tires.

In carrying out my invention, I provide a pair of separate bumper members adapted to be attached respectively to the chassis side bars in any convenient position, and to extend laterally so as to terminate adjacent the outer edges of the rear fenders. The manner in which these protecting elements are formed, and their adaptability for installation on existing vehicles will be hereinafter more fully set forth in connection with the following description, which pertains to the accompanying drawings, and the essential features will be summarized in the claims.

In the drawings, Fig. 1 is an end view of an automobile shown diagrammatically and having my invention attached thereto; Figs. 2 and 3 are side elevations shown diagrammatically of a motor vehicle having two forms of my invention attached thereto; Fig. 4 is a plan view of my invention according to the form shown in Fig. 3; and Figs. 5 and 6 are sections through the chassis side bars showing the manner in which the protecting elements may be attached to the chassis bar.

Designating the parts shown in the drawings by the use of reference characters, 10 and 11 indicate in general, two independent bumper members which are adapted to be attached to the chassis side bars 12 and 13 respectively. Each bumper member comprises a single strip of flat, spring steel bent backwardly upon itself and secured at the ends to one of the side bars. The intermediate portion extends laterally and outwardly to protect the fenders. When the U-shaped bumper is employed, the ends thereof may be attached to the side bars, as shown in Figs. 1 and 5, wherein securing members 15 extend on opposite vertical sides of the respective bars. To increase the resiliency of the bumpers, I may curve the arms in the same direction, as at 16 and 17, in Figs. 4 to 6 respectively.

Where the frame extension permits the use of a bumper, as illustrated in Figs. 1 and 5, then the securing members 15 may extend on opposite vertical sides of the chassis side bars. Where however, the construction is such that clearance is required, I may employ a construction, as indicated in Figs. 4 or 6. In Fig. 4, the sides of the bumper, as at 20 and 21, are twisted an angle of 90° and the ends are bent to extend along opposite sides of the chassis bars, whereupon the securing members 15 are disposed above and below the respective bars. In Fig. 6, the ends are bent at an angle to the curved arms, as at 18 and 19, while the securing members 15 are disposed above and below the side bar. Various other forms may be employed for attaching the individual bumpers to the supports therefor, but in any case, the bumper preferably embodies a bent member having a re-entrant curve intermediate the support therefor, and the free end thereof.

A bumper constructed according to my invention, may be readily formed and attached to existing vehicles without necessitating the use of members which extend entirely across the rear of the vehicle. In this way, spare tires may be readily removed without impairing the protection required for the projecting ends of the rear fenders.

Having thus described my invention, I claim:—

1. An automobile bumper comprising a one-piece impact member bent backwardly upon itself to form two side portions substantially parallel throughout the length thereof, the ends of said bumper comprising clamping portions affording rigid attachment to a chassis side bar, and the intermediate portions extending outwardly from the side bar and terminating adjacent the outer edge of an adjacent fender.

2. An automobile bumper, comprising a one-piece impact member having the ends thereof shaped to straddle a chassis side bar and comprising clamping portions affording rigid attachment to the bar and having a body portion substantially U-shaped and arranged to extend outwardly from the side of the chassis.

3. An automobile bumper, comprising a one-piece member having the body thereof U-shaped and having provision adjacent the ends for clamping attachment to a chassis side bar, said body portion projecting laterally and outwardly from the side bar and terminating adjacent the outer edge of a fender.

4. The combination with an automobile chassis having a side bar and fender, of a bumper comprising a one-piece strap, the ends of which are in clamped engagement with the top and bottom of the side bar, and the intermediate portions of which comprise an inturned band which terminates at the outer edge of the fender said portions being similarly curved and substantially parallel.

5. An automobile bumper, comprising a one-piece U-shaped strap having the ends thereof formed to comprise a clamp affording attachment to the top and bottom surface of a chassis side bar, and having portions intermediate the side bar and free end thereof similarly curved.

6. An automobile bumper comprising a one-piece strap having a recurved end portion and having substantially parallel side portions, and means for securing the ends of the side portions to a chassis side bar.

7. In combination, an automobile chassis having a side bar, and a fender, a bumper comprising a one-piece recurved strap, the ends of which are parallel and in abutting engagement with opposite sides of one of said bars, and the intermediate portions of which extend laterally from the chassis and terminate adjacent the outer edge of the fender and means acting on the end of the bumper and independent of the chassis for maintaining the bumper in rigid engagement with said chassis side bar.

In testimony whereof, I hereunto affix my signature.

EDGAR S. LUDLOW.